July 5, 1960 W. F. WILEY, JR 2,944,223

DELAYED, AMPLIFIED AUTOMATIC VOLUME CONTROL SYSTEM FOR RADIO RECEIVERS

Filed Nov. 3, 1958 2 Sheets-Sheet 1

INVENTOR.
Wallace F. Wiley, Jr.

BY

ATTORNEY.

July 5, 1960 W. F. WILEY, JR 2,944,223

DELAYED, AMPLIFIED AUTOMATIC VOLUME CONTROL SYSTEM FOR RADIO RECEIVERS

Filed Nov. 3, 1958 2 Sheets-Sheet 2

INVENTOR.
Wallace F. Wiley, Jr.

BY [signature]
ATTORNEY.

United States Patent Office 2,944,223

Patented July 5, 1960

2,944,223

DELAYED, AMPLIFIED AUTOMATIC VOLUME CONTROL SYSTEM FOR RADIO RECEIVERS

Wallace F. Wiley, Jr., Prairie Village, Kans., assignor to Wilcox Electric Company, Inc., Kansas City, Mo., a corporation of Kansas Filed Nov. 3, 1958, Ser. No. 771,598

10 Claims. (Cl. 330—139)

Figures 1, 2:
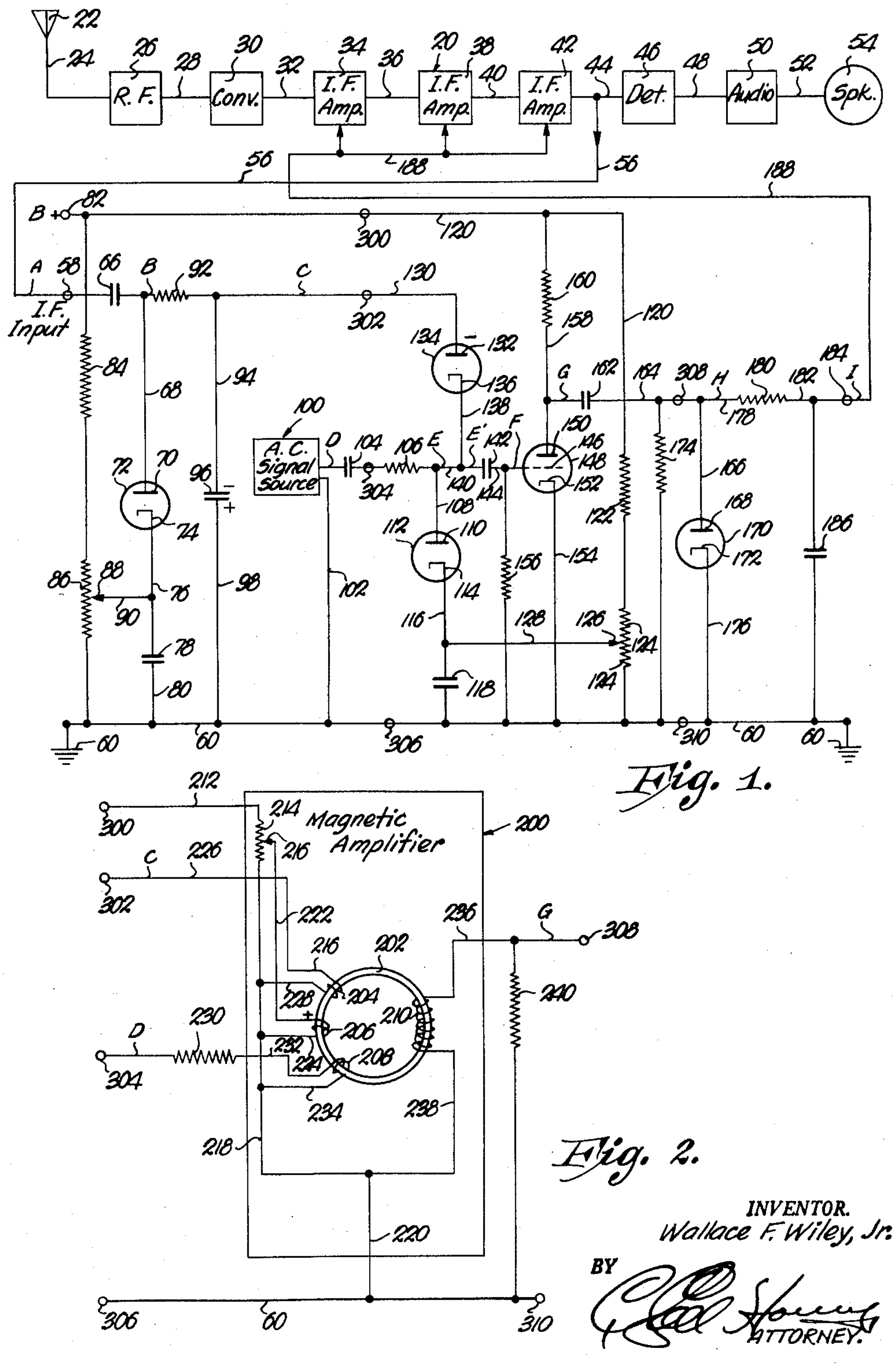

This invention relates to the field of electronic circuitry, especially that pertaining to radio communications equipment, and, more particularly, to an improved system for providing a delayed, amplified, automatic volume control (or "A.V.C.") voltage adaptable for application to signal amplifying stages of a radio receiver or the like for controlling the gain or amplification of the latter.

Convention circuitry for providing A.V.C. voltages in radio receiving and similar apparatus, are notoriously subject to a number of serious disadvantages which become more acute as the complexity and performance requirements of the equipment are increased, as in precision, communications type radio receivers. Among such disadvantages may be listed their usual low gain characteristics and the fact that they normally require the provision of a negative supply voltage for operation of the direct current amplifier ordinarily employed in conventional systems.

Attempt has been previously made to solve the problem by what is commonly referred to as the "subsidiary I.F. path" method of obtaining A.V.C. voltages. Like its more common predecessors however, it has proved to be subject to serious objections, including the great susceptibility of apparatus utilizing such method to undesired and uncontrollable oscillation, as well as the substantial expense and difficulty of adjustment associated with the manufacture and use of subsidiary I.F. path A.V.C. circuitry.

Accordingly, it is the primary object of this invention to overcome all of the mentioned and other disadvantages inherent in conventional prior A.V.C. systems, including both those utilizing the subsidiary I.F. path principle and those employing a direct current amplifier stage.

It is another important object of this invention to provide an improved A.V.C. system which operates at a high gain level rendering the operation of same extremely sensitive and capable of producing substantial outputs of control voltage even from relatively weak input signals.

It is another important object of the invention to provide such an improved A.V.C. system which requires no supply of negative voltage for its operation.

It is another important object of this invention to provide such an improved A.V.C. system which is extremely stable and reliable in operation and has virtually no tendency to go into undesired oscillation.

It is another important object of this invention to provide such an improved A.V.C. system wherein a signal sample is taken from the receiver circuitry or the like with which the system is associated, which signal sample is rectified and filtered, then applied as a negative biasing voltage to one side of a unidirectionally conductive device, to the other side of which device is applied the output of an alternating current oscillator at least a portion of whose positive half cycles have been eliminated, to present a pulsating, negative, direct current voltage whose amplitude is clipped or limited by the action of such negatively biased, unidirectionally conductive device, such negative, pulsating, direct current signal (whose maximum amplitude is limited in accordance with the level of the biasing voltage being obtained from rectification of the signal from the receiver) then being amplified, rectified and filtered to provide the desired automatic volume control output voltage.

It is another important object of this invention to provide such improved A.V.C. apparatus which includes means for adjustably controlling the portion of the positive half cycles of the sampled output of the receiver which will be eliminated during rectification and before application to the unidirectionally conductive device for biasing the latter, whereby the amount of delay applied by the system is made controllably variable.

It is another important object of this invention to provide such A.V.C. apparatus which includes means for adjustably controlling the portion of the positive half cycles of the output from the local alternating current signal source which will be eliminated before application to the biased, unidirectionally conductive device, whereby such means are adapted to serve as an "R.F. gain" control for the receiver with which the apparatus is associated.

Still another important object of a modified form of the invention is to provide A.V.C. apparatus having essentially the same operating characteristics above mentioned in which a magnetic amplifier is utilized and constitutes the only principal component except for an input rectifying circuit, an output rectifying circuit, and a local alternating current signal source.

Many other important objects of this invention, including certain details of construction deemed to be significant, will be made clear or become apparent as the following description of the invention progresses.

In the accompanying drawings:

Figure 1 is a schematic diagram of one embodiment of A.V.C system made in accordance with this invention showing the same in association with an illustrative radio receiver depicted in block diagrammatic form;

Fig. 2 is a schematic diagram representing an illustrative form of magnetic amplifier and indicating the manner in which such amplifier can be substituted in the circuitry of Fig. 1 in lieu of a portion of the latter; and Figs. 3, 4, 5, 6, 7, 8, 9, 10 and 11 are representations of the basic characteristics of illustrative electrical wave forms as would be present at various indicated points in the circuitry of Figs. 1 and 2 under two hypothetical conditions of signal level sampling from the receiver with which the A.V.C. system is associated.

Referring now first to the currently preferred embodiments of the invention illustrated in Fig. 1, and to the wave forms represented in Figs. 3–11 inclusive, the numeral 20 generally designates a superheterodyne radio receiver which may typically include, for instance, an antenna 22 coupled by conductive means 24 with a radio frequency amplifier stage 26 whose output is coupled by conductive means 28 to a heterodyne conversion stage 30 whose output is coupled by conductive means 32 to a first intermediate frequency amplifier stage 34 and thence successively through conductive means 36, a second intermediate frequency amplifier stage 38, conductive means 40, a third intermediate frequency amplifier stage 42 and conductive means 44 to a detector stage 46 whose output is in turn coupled through conductive means 48 to an audio frequency amplification stage 50 feeding a loud speaker 54 through conductive means 52. Manifestly, the circuitry or arrangement of stages in receiver 20 may be greatly varied to include more or less stages of radio frequency, intermediate frequency or audio frequency amplification or to utilize a mixer stage and separate oscillator in place of the converter stage 30, or in various other ways which are well known to those skilled in the art and will be apparent to the latter as having no material bearing on the principles and substances of this invention.

Obviously, the electrical output from intermediate frequency amplifier stage 42 will corresnd in amplitude to the relative strength of a radio signal picked up by antenna 22 and amplified by stages 26, 30, 34, 38 and 42. In the application of an automatic volume control system to a radio receiver such as receiver 20, it is, of course, customary to sample an output such as that from the last I.F. amplifier stage 42 and utilize such sampled voltage to create a biasing voltage which, after amplification, is applied back to one or more of the intermediate frequency or/and radio frequency amplifier stages of the receiver in such manner that, as the amplitude of the sampled voltage increases, the biasing voltage will be correspondingly adjusted to decrease the gain of the intermediate frequency or radio frequency stage or stages to which such biasing control voltage is applied.

Since the full gain or amplification of all the amplifying stages of the receiver 20 should be applied to very weak signals picked up by the antenna 22, it is desirable to "delay" the action of an A.V.C. system applied to the receiver 20 in such manner that no adjustment of the biasing voltage applied to the amplifying stages of the receiver 20 will be made until a certain level of output from the sampled stage 42 is presented.

It is also desirable, however, that with signals producing sampled output voltages even slightly above the level of the "delay" or minimum action condition, some adjustment of the biasing control voltages upon the amplifying stages of the receiver 20 shall be made and that the system will be sufficiently sensitive to assure that such adjustment is of appropriate magnitude. With conventional prior A.V.C. systems, such result is not attainable. The solution now provided depends largely on the fact that the sampled output signal from the receiver, instead of being used to create the desired receiver biasing voltage by serving as the source of signal which is amplified to produce such biasing voltage, is employed as a control signal for controlling the portion of the output from a separate, relatively high level, local signal source which will be utilized to produce the desired biasing voltage.

In the present invention, and referring particularly to Figure 1, the output of the I.F. amplifier stage 42 appearing on conductive means 44 is tapped off and sampled through conductive means 56 interconnecting conductive means 44 with the intermediate frequency input terminal 58 of the A.V.C. system of the invention. It will be understood that the conductive means 28, 32, 36, 40, 44, 48 and 52 of receiver 20 may be of various characters adapted for coupling the electrical signals from one stage to the succeeding stage (for instance, transformer means may be employed) and that each of said conductive or coupling means will ordinarily include two sides, one of which is illustrated in the upper portion of Fig. 1 and the other of which constitutes ground, which it may be observed is the same or a common ground to that designated 60, and utilized in connection with the A.V.C. system of the receiver 20.

Figures 3, 4, 5, 6, 7, 8, 9, 10, 11:
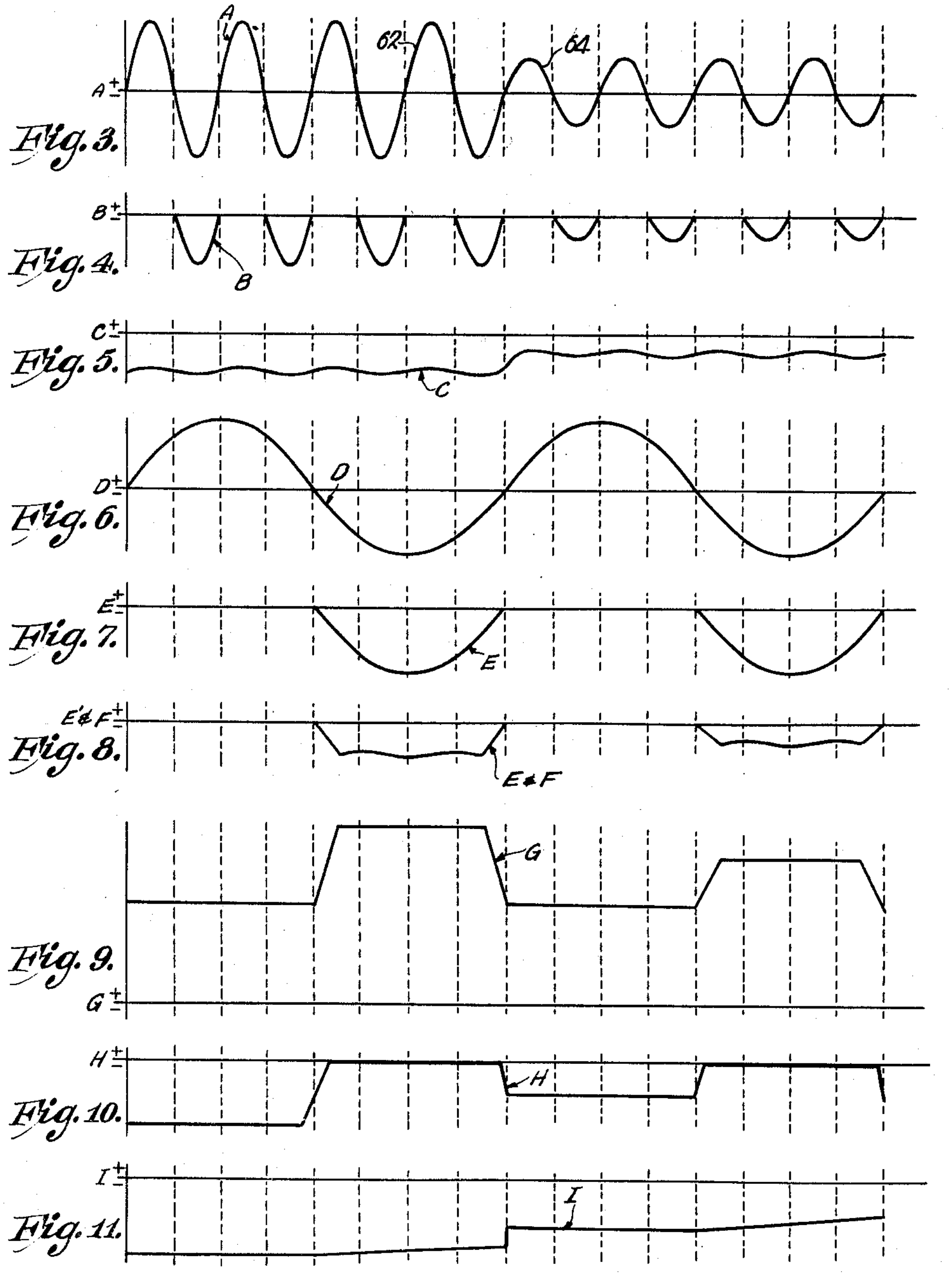

Figure 3 shows, for purposes of illustration only, a hypothetical radio carrier "A" of sine wave form such as might be sampled through conductive means 56 and presented to terminal 58 (the amplitude modulation also normally present on the wave form not being shown since, in practice, its effects on the operation of the A.V.C. system would be negligible). The letter "A" on the conductive means 56 indicates a point at which such wave form "A" illustrated in Fig. 3 would appear. In order to show the operation of the A.V.C. system to be described under conditions of different signal input level to the terminal 58, the curve of input signal "A" includes a first portion 62 of one amplitude and a succeeding portion 64 of amplitude substantially one-half that of the portion 62.

Such input signal "A" corresponding to the sampled output from intermediate frequency amplifier stage 42 is coupled from terminal 58 through a coupling capacitor 66 and conductive means 68 with the anode element or terminal 70 of a diode 72 having a cathode element or terminal 74 coupled through conductive means 76, a condenser 78 and conductive mens 80 with ground 60.

A conventional source (not shown) of high, positive voltage is coupled with a "B plus" terminal 82, is coupled with ground 60 through a pair of voltage dividing resistances 84 and 86, the latter constituting a potentiometer and being provided with a movable tap 88 which is coupled by conductive means 90 with conductive means 76 and cathode terminal 74 of diode 72. Although the diode 72 could be of electronic or vacuum tube form, it preferably (particularly where space and power consumption requirements are important) is comprised of a germanium diode unit such as are commonly available on the market under the designation "1N111."

Diode 72 functions as the A.V.C. detector of the system, which rectifies the signal "A" to remove all or some predetermined portion of the positive half cycles thereof, which pass through the diode 72 when the voltage applied to anode terminal 70 thereof is more positive than that applied to cathode terminal 74 thereof. The resulting, pulsating, negative, direct current signal is illustrated as curve "B" in Fig. 4.

As will be apparent to those skilled in the art, the tap 88 provides an adjustment by which the cathode terminal 74 of diode 72 may be maintained above ground potential, if desired, to provide a variable delay in the action of the system. Assuming that the action of the A.V.C. system is to be delayed (i.e. rendered unresponsive to sampled outputs from receiver 20 below a level corresponding with a predetermined signal strength), movement of the tap 88 to a point on potentiometer 86 above ground 60, will impose a corresponding, relatively small positive voltage upon cathode terminal 74. Since diode 72 is a unidirectionally conductive device and will conduct only when the voltage applied to anode terminal 70 is more positive than that applied to cathode terminal 74, it will be clear that adjustment of the tap 88 will permit "grounding out" of less than all of the positive half cycles of the signal "A" in order to provide the desired delay.

The signal "B" (appearing at point "B" on Fig. 1) which has been rectified by diode 72, is coupled through a resistance 92 and conductive means 94 with a relatively large capacitor 96 which is oppositely grounded by conductive means 98. Resistance 92 and capacitor 96 serve as a filter for substantially smoothing out the pulsations from signal "B" to present a filtered, rectified, negative, direct current voltage as illustrated by the curve of signal "C" in Fig. 5. As will be apparent from Figs. 3, 4 and 5, the peak amplitudes of signal "B" and the level of the voltage of signal "C" decrease as the amplitude of the input signal "A" shifts from the level of portion 62 thereof to the lower level of portion 64 thereof.

An alternating curent signal source generally designated 100, is provided and may be of any form suitable for producing a sine wave alternating current output of the desired frequency. The range of frequencies usable from signal source 100 is fairly broad, working models having operated satisfactorily with an output of 400 cycles per second, although a supersonic frequency output of the order of 20,000 to 30,000 cycles per second is preferred.

Accordingly, signal source 100 may constitute an electronic oscillator, which might have its frequency controlled by tuning fork, piezoelectric crystal, Wein bridge or other frequency determining means. Alternately, where a lower frequency output is to be used, source 100 may simply constitute an alternating current power line having current of the desired frequency thereon, the important consideration being that, whatever the nature of source 100, its output should be of substantially constant voltage amplitude and preferably of substantially pure sine wave form. A satisfactory type of output for the source 100 is illustrated in Fig. 6 by signal curve "D."

Source 100 is coupled through conductive means 102 with ground 60 and through a capacitor 104, a resistance 106 and conductive means 108 with the anode element or terminal 110 of a diode 112 having its cathode element or terminal 114 coupled with ground through conductive means 116 and a capacitor 118. Diode 112 functions as an eliminator for eliminating the positive half cycles (or a predetermined portion thereof) from the output signal "D" of source 100 to present a pulsating, negative, direct current output of the form generally indicated by the signal curve "E" of Fig. 7. Diode 112 may, as was the case with diode 72, be either electronic in form or, and preferably, constitute a germanium diode such as those of the 1N111 type (a silicon diode could also be used, if desired).

The "B plus" terminal 82 is coupled through conductive means 120 and a pair of voltage dividing resistances 122 and 124 with ground 60, resistance 124 being a potentiometer having a variable tap 126 coupled through conductive means 128 with conductive means 116 and cathode terminal 114 of diode 112. As will be made more clear hereinafter, the potentiometer 124 serves as a radio frequency gain control for the receiver 20 and, more specifically, provides an adjustment for a small positive biasing voltage which may be applied to the cathode terminal 114 of diode 112 to control the portion of the positive half cycles of the signal output "D" which are "grounded out" or eliminated through the diode 112.

The rectified, filtered input signal "C" is coupled through conductive means 130 with the anode portion 132 of a third diode 134 having its cathode element or terminal 136 coupled by conductive means 138 with conductive means 140 to which the anode terminal 110 of diode 112 is also coupled by conductive means 108.

Diode 134 may also be either electronic in nature or constitute a type 1N111 germanium diode. Diode 134 functions as a clipper for clipping the peak portion from the negative half cycles of the signal wave "E" from which the positive half cycles (or a portion thereof) have already been eliminated by the action of diode 112. As will be apparent, the amount of the negative half cycles of signal "E" which are clipped by the diode 134 depends upon the control or biasing action of the wave signal "C" applied to the anode 132 of diode 134, since negative voltages are applied to both the anode 132 and the cathode 136 of diode 134 and the latter will conduct whenever the cathode 136 is more negative than the anode 132 (or, in other words, the anode 132 is relatively more positive than the cathode 136). It may now be pointed out that when, by virtue of an adjustment of tap 126 above ground 60 the signal "E" also includes a positive portion, the latter cannot be clipped since anode 132 is never positive. This makes possible the use of potentiometer 124 as an R.F. gain control for receiver 20.

The clipped, negative (unless a positive portion is also present from the adjustment of tap 126), pulsating, direct current output presented on cathode 136 is illustrated in Fig. 8 by the signal curve designated "E'" and "F." As will now be evident, curve "E" is somewhat theoretical and was shown as an isolated wave form only for purposes of explanation, since anode 110 and cathode 136 are interconnected and the actual wave during operation would appear in the form of signal "E'" and "F." Such signal wave "E'" is coupled from conductive means 140 through a capacitor 142 and conductive means 144 with the grid 146 of an electronic amplifier tube 148 having an anode 150, a cathode 152 and a filament or heater (not shown). For the sake of illustration, tube 148 is shown as a triode and may constitute one-half of a type 12AX7 tube, although other tubes, including pentodes, could be used if desired. Cathode 152 is coupled with ground 60 through conductive means 154. Grid 146 is coupled with ground 60 through a grid resistance 156. Anode or plate 150 is coupled through conductive means 158 and a plate resistance 160 with conductive means 120 and "B plus" terminal 82.

The output derived from tube 148 is substantially as illustrated by the signal curve "G" shown in Fig. 9 and is coupled from anode 150 through conductive means 158, a capacitor 162, conductive means 164, and conductive means 166 with the anode 168 of a diode 170 having a cathode 172. Diode 170, which functions as the automatic volume control voltage rectifier, is preferably of the electronic type and may constitute one-half of a type 12AU7 tube, although a type 1N111 germanium diode could be employed if desired. Tubes 148 and 170 could obviously also be of a type incorporated within a single envelope. A plate load resistance 174 for tube 148 is coupled between conductive means 164 and ground 60. Cathode 172 of tube 170 is coupled with ground 60 through conductive means 176.

Plate or anode 168 or tube 170 is coupled through conductive means 166, conductive means 178, a filter resistor 180 and conductive means 182 with an output terminal 184. A filtering capacitor 186 is coupled between conductive means 182 and ground 60. The output signal on conductive means 178, after it has been acted upon by the rectifier tube 170, is represented by signal curve "H" shown in Fig. 10, while the wave form of the output voltage presented to output terminal 184 after filtering by the RC network 180–186 is shown in Fig. 11 as output curve "I." The output signal or A.V.C. control voltage "I" from output terminal 184 is coupled through conductive means 188 back to receiver 20 and there applied to one or more of the amplifying stages of the receiver 20. As illustrated, the A.V.C. control voltage is coupled into the three I.F. amplifier stages 34, 38 and 42.

*Operation*

In operation, assuming that the I.F. amplifiers 34, 38 and 42 of receiver 20 operate, for instance, at 100 kilocycles, the curve "A" represents the wave form of a sampled 100 kilocycle carrier frequency signal which has been converted to that frequency by the converter stage 30 and which has been amplified prior to conversion by the radio frequency amplifier stage 26 and after conversion by the I.F. stages 34, 38 and 42. For simplicity of illustration, the sampled signal "A" is shown in sine wave form and, as above noted, will be understood to represent the radio frequency component of an amplitude modulated carrier wave being received by receiver 20, no modulation being illustrated thereon because it has virtually no effect on the operation of the A.V.C. system and would only unnecessarily complicate the wave form curves by which the invention is explained. It will be clear to those skilled in the art that the reason that the operation of the circuitry would not be materially affected by the presence of modulation on the signal "A" is that the effects of the modulation "balance out" or cancel as to time periods of the order which are significant to the operation of the A.V.C. system.

The sampled signal "A" delivered to the A.V.C. system input terminal 58 is first detected or rectified by having a controllable portion of its positive half cycles removed by the conduction thereof through diode 72. In order to provide for an adjustable "delay" in the action of the A.V.C. system, the cathode 74 of diode 72 may be held at a positive potential above ground level through adjustment of the tap 88 of voltage dividing potentiometer 86. Since diode 72 will conduct to eliminate portions of the positive half cycle of the signal "A" only when the anode 70 is more positive than the cathode 74, it will be clear that appropriate adjustment of the tap 88 will permit the amplitude of the remaining negative pulses constituting the signal represented by curve "B" to be adjustably controlled to provide various degrees of "delay" in the system.

The negative pulsating signal "B" is smoothed by the RC filter network 92–96 and applied to the anode 132 of the clipper diode 134, it being noted that anode 132 is thus held at a negative potential corresponding to the amplitude of the sampled signal "A."

Meanwhile, the oscillator or signal generator 100 is producing a sine wave output "D" which, for purposes of illustration, is shown as being a sine wave having a frequency of 25 kilocycles. Such locally produced and relatively strong signal "D," which it is noted in a typical operating situation would have an amplitude several times that of the signal "A," has a controllable portion of its positive half cycles removed by conduction through the eliminator diode 112, the precise amount of the positive half cycles which is removed being dependent upon the adjustment of the gain controlling tap 126 of potentiometer 124.

The remaining negative pulsating signal "E" then is coupled with the cathode 136 of clipper diode 134. Obviously, whenever the amplitude of the signal "E" on cathode 136 is greater (that is, more negative) than the amplitude of the negative voltage being applied to anode 132, a portion of the negative peaks of the signal "E" will be clipped by the conduction of diode 134. The extent of such clipping action is, presuming a constant amplitude of the signal "E" derived from source 100, directly dependent upon the level of the voltage "C," and therefore, the amplitude of the sampled signal "A." The resulting, clipped, negative, pulsating voltage, which is designated "E'" and "F" in the drawings, is applied to the control grid 146 of the amplifier tube 148.

As will be apparent to those skilled in the art, as the tap 126 is moved away from the end of potentiometer 124 grounded at 60 to apply an increasing positive biasing voltage to the cathode 114 of diode 112, the latter will eliminate a lesser portion of the positive half cycles of signal "D," thereby producing a signal "F" of larger magnitude and resulting in the ultimate application of a gain-decreasing control voltage at output terminal 184, which is thence applied to receiver 20.

The amplified output "G" of tube 148 is then rectified by the tube 170 (see curve "H") and filtered by the RC network 180–186, to present the automatic volume control voltage "I," which is fed from terminal 184 back to selected amplifying stages of the receiver 20 to control the gain of the latter.

It will now be apparent that, whereas in conventional A.V.C. systems utilizing direct current amplifiers, the apparatus must work with and create a control voltage from signals of only that amplitude available in the sampled stage of the receiver, the system of this invention locally produces and provides from the source 100 an electrical signal of substantial, initial amplitude from which the desired control voltage can be stably derived. In other words, in the system of this invention the sampled signal "A" from the receiver 20 is utilized only for controlling the ultimate amplitude of a locally generated A.V.C. voltage, rather than itself serving as the source of such control voltage. That the circuitry described is ideally adapted for accomplishing the abovementioned and other advantageous objects of the invention, should now be entirely clear to those skilled in the art.

In Fig. 2 is illustrated a portion of a modified embodiment of the invention wherein a magnetic amplifier generally designated 200, is utilized in place of diode 112, clipper diode 134, amplifier tube 148 and their associated circuitry. Although various types of magnetic amplifiers known to those skilled in the art could be used, the following described illustrative form of magnetic amplifier 200 will serve to illustrate the principles of this facet of the invention.

As shown, the magnetic amplifier may include a core 202 having primary or input windings 204, 206 and 208, and a secondary or output winding 210 thereon.

Referring to Fig. 1, there are illustrated therein a number of terminals respectively designated 300, 302, 304, 306, 308 and 310 between which the circuitry of the first described embodiment of the invention may be disconnected and the magnetic amplifier circuitry of Fig. 2 substituted, the correspondingly numbered terminals of Fig. 2 indicating the same points in the circuitry of Fig. 1 as are represented by said terminal points.

In the modified, magnetic amplifier form of the invention, the terminal 300, which comes from the "B plus" terminal 82, is coupled through a conductor 212, a voltage dividing potentiometer 214 having a variable tap 216 and conductors 218 and 220 with ground 60. The tap 216 is coupled through conductive means 222 with input winding 206, the other side of the latter being grounded through conductive means 224, 218 and 220.

Input terminal 302 is coupled through conductive means 226 with one side of input winding 204, the other side thereof being grounded through conductive means 228, 218 and 220.

The local signal source terminal 304 is coupled through a resistance 230 and conductive means 232 with one side of input winding 208, the other side of which is grounded through conductive means 234, 218 and 220.

One side of the output winding 210 is coupled through conductive means 236 with the amplified output terminal 308, the other side of output winding 210 being grounded through conductive means 238 and 220. A load resistance 240 is coupled between conductive means 236 and ground 60, terminals 306 and 310 being coupled with ground 60.

In the operation of the modified embodiment of the invention described in connection with Fig. 2, the tap 216 of potentiometer 214 is adjusted for the passage of a biasing current through input winding 206 of predetermined magnitude appropriate for maintaining the core 202 in a condition of magnetization disposed along the curve of its saturation characteristics such that, with the local source signal "D" being applied to input winding 208 but no input signal "C" being applied to input winding 204, substantially no output signal "G" will be derived from the output winding 210, but that as a signal "C" is applied to winding 204 in opposition to the fixed bias on winding 206, an output "G" will be produced from the output winding 210 which is of amplitude corresponding to the amplitude of the applied signal "C."

Thus, the magnetic amplifier 200 accomplishes in one device the eliminating, comparative clipping and amplifying operations performed in the embodiment of Fig. 1 by the devices 112, 134 and 148 respectively. The ultimate result is substantially the same in the case of both embodiments of the invention and, although the embodiment of Fig. 1 is currently preferred, applications may exist wherein the utilization of a magnetic amplifier 200 would be appropriate.

The fact that two embodiments of the invention which operate upon the same basic principles, although involving specifically different structures in part, have been shown for purposes of illustration, is demonstrative that a considerable number of minor modifications or changes could be made from the exact structure described for purposes of illustration without departing from the true spirit or intentions of the invention. Accordingly, it is to be understood that the invention should be deemed limited only by the fair scope of the following claims.

Having thus described the invention, what is claimed as new and desired to be secured by Letters Patent is:

1. Automatic gain control apparatus for use with electrical signal amplifying equipment having input terminal to which alternating current, input signals of relatively high frequency to be amplified are applied, signal output terminal means at which said input signals in amplified form are presented, and gain controlling voltage terminal means to which a direct current, control voltage of variable level measured from a zero voltage reference value may be applied for controlling the amplification effected by said equipment between said input terminal means and said output terminal means thereof, said apparatus being adapted for producing said control voltage and comprising the combination of: detector means adapted for coupling with said output terminal means of said equipment for deriving from the latter a continuous sampling of said amplified, high frequency signals and arranged for rectifying said amplified, high frequency signals to present a first, pulsating, direct current, voltage output of variable amplitude generally corresponding to, and at least as small as, the concurrent amplitude of said amplified, high frequency signals, and of periodicity corresponding to said relatively high frequency; first smoothing filter means coupled with said detector means for receiving from the latter said first output and arranged for integrating said first output to present a second, filtered, direct current, voltage output whose level varies smoothly in general correspondence with, but by changes of magnitude at least as limited as concurrent variations in, the amplitude of said amplified, high frequency signals; a source of a third, alternating current voltage output of substantially constant amplitude greater than the usual maximum amplitude of said amplified, high frequency signals and of relatively low frequency, lower than said relatively high frequency; comparative mixing and amplifying means coupled with said first filter means for receiving from the latter said second output, coupled with said source for receiving from the latter said third output, and arranged for removing from said third output those portions of its peaks which are of magnitude greater than the level of said second output and amplifying the resultant thereof to present a fourth, amplified, pulsating, generally square wave type, direct current, voltage output of variable amplitude generally corresponding to, but characterized by greater changes in magnitude than concurrent variations in, the concurrent level of said second output, and of periodicity corresponding to said relatively low frequency; rectifier means coupled with said mixing and amplifying means for receiving from the latter said fourth output and arranged for rectifying said fourth output and referencing the latter to said zero voltage reference value to present a fifth, amplified, pulsating, generally square wave type, direct current, voltage output whose amplitude measured from said zero voltage reference value generally corresponds to, but is characterized by greater changes in magnitude than concurrent variations in, the level of said second output, and whose periodicity corresponds to said relatively low frequency; and second smoothing filter means coupled with said rectifier means for receiving from the latter said fifth output, arranged for integrating said fifth output to present a sixth, filtered, direct current, voltage output whose level measured from said zero voltage reference value generally corresponds to, but is characterized by greater changes in magnitude than concurrent variations in the level of said second output, and adapted for coupling with said gain controlling terminal means of said equipment for applying to the latter said sixth output as said control voltage.

2. Automatic gain control apparatus for use with electrical signal amplifying equipment having input terminal to which alternating current, input signals of relatively high frequency to be amplified are applied, signal output terminal means at which said input signals in amplified form are presented, and gain controlling voltage terminal means to which a direct current, control voltage of predetermined polarity and of variable level measured from a zero voltage reference value may be applied for controlling the amplification effected by said equipment between said input terminal means and said output terminal means thereof, said apparatus being adapted for producing said control voltage and comprising the combination of: detector means adapted for coupling with said output terminal means of said equipment for deriving from the latter a continuous sampling of said amplified, high frequency signals and arranged for rectifying said amplified, high frequency signals to present a first, pulsating, direct current, voltage output of said predetermined polarity, of variable amplitude generally corresponding to, and at least as small as, the concurrent amplitude of said amplified, high frequency signals, and of periodicity corresponding to said relatively high frequency; first smoothing filter means coupled with said detector means for receiving from the latter said first output and arranged for integrating said first output to present a second, filtered, direct current, voltage output of said predetermined polarity whose level varies smoothly in general correspondence with, but by changes of magnitude at least as limited as concurrent variations in, the amplitude of said amplified, high frequency signals; a source of a third, alternating current, voltage output of substantially constant amplitude greater than the usual maximum amplitude of said amplified, high frequency signals and of relatively low frequency, lower than said relatively high frequency; comparative mixing and amplifying means coupled with said first filter means for receiving from the latter said second output, coupled with said source for receiving from the latter said third output, and arranged for removing from said third output those portions of its peaks which are of magnitude greater than the level of said second output and amplifying the resultant thereof to present a fourth, amplified, pulsating, generally square wave type, direct current, voltage output of the opposite polarity, of variable amplitude generally corresponding to, but characterized by greater changes in magnitude than concurrent variations in, the concurrent level of said second output, and of periodicity corresponding to said relatively low frequency; rectifier means coupled with said mixing and amplifying means for receiving from the latter said fourth output and arranged for rectifying said fourth output and referencing the latter to said zero voltage reference value to present a fifth, amplified, pulsating, generally square wave type, direct current, voltage output of said predetermined polarity whose amplitude measured from said zero voltage reference value generally corresponds to, but is characterized by greater changes in magnitude than concurrent variations in, the level of said second output, and whose periodicity corresponds to said relatively low frequency; and second smoothing filter means coupled with said rectifier means for receiving from the latter said fifth output, arranged for integrating said fifth output to present a sixth, filtered, direct current, voltage output of said predetermined polarity whose level measured from said zero voltage reference value generally corresponds to, but is characterized by greater changes in magnitude than concurrent variations in, the level of said second output, and adapted for coupling with said gain controlling terminal means of said equipment for applying to the latter said sixth output as said control voltage.

3. Automatic gain control apparatus for use with electrical signal amplifying equipment having input terminal to which alternating current, input signals of relatively high frequency to be amplified are applied, signal output terminal means at which said input signals in amplified form are presented, and gain controlling voltage terminal means to which a negative, direct current, control voltage of variable level measured from a zero voltage reference value may be applied for controlling the amplification effected by said equipment between said input terminal means and said output terminal means thereof, said apparatus being adapted for producing said control voltage and comprising the combination of: detector means adapted for coupling with said output terminal means of said equipment for deriving from the latter a continuous sampling of said amplified, high frequency signals and arranged for rectifying said amplified, high frequency signals to present a first, pulsating negative, direct current, voltage output of variable amplitude generally corresponding to, and at least as small as, the concurrent amplitude of said amplified, high frequency signals, and of periodicity corresponding to said relatively high frequency; first smoothing filter means coupled with said detector means for receiving from the latter said first output and arranged for integrating said first output to present a second, filtered, negative, direct current, voltage output whose level varies smoothly in general correspondence with, but by change of magnitude at least as limited as concurrent variations in, the amplitude of said amplified, high frequency signals; a source of a third, alternating current, voltage output of substantially constant amplitude greater than the usual maximum amplitude of said amplified, high frequency signals and of relatively low frequency, lower than said relatively high frequency; comparative mixing and amplifying means coupled with said first filter means for receiving from the latter said second output, coupled with said source for receiving from the latter said third output, and arranged for removing from said third output those portions of its peaks which are of magnitude greater than the level of said second output and amplifying the resultant thereof to present a fourth, amplified, pulsating, generally square wave type, positive, direct current, voltage output of variable amplitude generally corresponding to, but characterized by greater changes in magnitude than concurrent variations in, the concurrent level of said second output, and of periodicity corresponding to said relatively low frequency; rectifier means coupled with said mixing and amplifying means for receiving from the latter said fourth output and arranged for rectifying said fourth output and referencing the latter to said zero voltage reference value to present a fifth, amplified, pulsating, generally square wave type, negative, direct current, voltage output whose amplitude measured from said zero voltage reference value generally corresponds to, but is characterized by greater changes in magnitude than concurrent variations in, the level of said second output, and whose periodicity corresponds to said relatively low frequency; and second smoothing filter means coupled with said rectifier means for receiving from the latter said fifth output, arranged for integrating said fifth output to present a sixth, filtered, negative, direct current, voltage output whose level measured from said zero voltage reference value generally corresponds to, but is characterized by greater changes in magnitude than concurrent variations in, the level of said second output, and adapted for coupling with said gain controlling terminal means of said equipment for applying to the latter said sixth output as said control voltage.

4. In apparatus as set forth in claim 3, wherein: said detector means comprises a diode device having a cathode and an anode, the anode and cathode of said device being respectively adapted for coupling with opposite sides of said output terminal means of said equipment, said first output being taken across the anode and the cathode of said device.

5. In apparatus as set forth in claim 4, wherein: there is provided means for applying a direct current bias of adjustable level to the cathode of said device.

6. In apparatus as set forth in claim 3, wherein: said comparative mixing and amplifying means includes a pair of diode devices each having a cathode and an anode, and a voltage amplifying unit having an input circuit and an output circuit, the cathode of one device is coupled to the anode of the other device, said second output is applied across the anode of said one device and the cathode of said other device, said third output is applied across the anode and the cathode of said other device, said input circuit is coupled across the anode and the cathode of said other device, and said fourth output is taken from said output circuit.

7. In apparatus as set forth in claim 6, wherein: there is provided means for applying a direct current bias of adjustable level to the cathode of said other device.

8. In apparatus as set forth in claim 3, wherein: said comparative mixing and amplifying means includes a magnetic amplifier unit having a pair of input windings, a biasing winding, and an output winding, said second and third outputs being applied respectively to said input winding, said fourth output being taken from said output winding.

9. In apparatus as set forth in claim 8, wherein: there is provided means for applying a direct current bias of adjustable level to said biasing winding.

10. In apparatus as set forth in claim 3, wherein: said rectifier means comprises a diode device having a cathode and an anode, said fourth output being applied to, and said fifth output being taken from, across the anode and cathode of said device.

References Cited in the file of this patent

UNITED STATES PATENTS

| | | |
|---|---|---|
| 1,931,660 | Kautter | Oct. 24, 1933 |
| 2,446,188 | Miller | Aug. 3, 1948 |